United States Patent [19]
Szentesi

[11] Patent Number: 5,844,886
[45] Date of Patent: Dec. 1, 1998

[54] SYSTEM AND METHOD FOR NETWORK OPTIMIZATION USING CODE BLOCKING

[75] Inventor: Áron Szentesi, Budapest, Hungary

[73] Assignee: Telefonaktiebolaget LM Ericsson (publ.), Stockholm, Sweden

[21] Appl. No.: 775,443

[22] Filed: Dec. 30, 1996

[51] Int. Cl.[6] ....................................................... H04J 3/14
[52] U.S. Cl. ........................................... 370/230; 370/252
[58] Field of Search ..................................... 370/230, 232, 370/233, 234, 237, 242, 244, 252, 253, 395, 229; 395/200.65, 200.68, 200.69

[56] References Cited

U.S. PATENT DOCUMENTS 5,694,390  12/1997  Yamato et al. ........................ 370/230

OTHER PUBLICATIONS

Raffaele Bolla, Franco Davoli, Mario Marchese, "Simple schemes for traffic integration at call set–up level in ATM networks", Computer Communications, 645–652, Jul. 1996.
Gerald R. Ash, *Network Design Models for Fixed & Dynamic Routing Networks*, pp. 463–468, Proceedings of Networks '96 Conference, Nov. 1996.
James A. Schmidt, M. Elizabeth Henry & Joseph J. Kapusinsky, Jr., *Reengineering International Network Planning and Servicing Using EIS*, pp. 353–358, Proceedings of Networks '96 Conference, Nov. 1996.
*Plasmasim—Intelligent network management*, pp. 1–6, Demonstration Booklet, Networks '96 Conference, Nov. 1996.

*Primary Examiner*—Chi H. Pham
*Assistant Examiner*—Afsar M. Qureshi
*Attorney, Agent, or Firm*—Jenkens & Gilchrist, P.C.; Thomas L. Crisman; Anant S. Narayanan

[57] ABSTRACT

A fast and efficient system and method for network management under traffic overload conditions is described. The technique uses an algorithm to automatically generate a close approximation of the optimum working state of a telecommunications network when the actual traffic is found to be greater than network capacity. The algorithm uses traffic blockage measurements obtained from distributed network switches and generates code blocking parameters that can be applied to the distributed network switches to enhance total revenue. The described technique provides additional revenue gains over that obtainable by partially rerouting traffic away from congested network links. The use of the described code blocking technique may be discontinued when the conditions causing the network overload are determined to have disappeared.

24 Claims, 10 Drawing Sheets

Fig. 8

DESTINATION NODE

| | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| 1 | | T | ✓ | T | ✓ | | ✓ | | | | | | | |
| 2 | T | | ✓ | ✓ | | T | | | | | | | ✓ | ✓ |
| 3 | ✓ | ✓ | | T | | | | | | | ✓ | ✓ | | |
| 4 | T | ✓ | T | | T | | | | | | ✓ | T | ✓ | |
| 5 | ✓ | | | T | | | | T | ✓ | T | ✓ | | | |
| 6 | | T | | | | | ✓ | | | | | | ✓ | ✓ |
| 7 | ✓ | | | | ✓ | | ✓ | | | | | | | ✓ |
| 8 | | | | | T | | ✓ | | ✓ | ✓ | | | | |
| 9 | | | | | ✓ | | | ✓ | | T | | | | |
| 10 | | | | ✓ | T | | | ✓ | T | | ✓ | | | |
| 11 | | | ✓ | T | ✓ | | | | | ✓ | | ✓ | | |
| 12 | | | ✓ | ✓ | | | | | | | ✓ | | ✓ | |
| 13 | | ✓ | | | ✓ | | | | | | | ✓ | | ✓ |
| 14 | | ✓ | | | ✓ | ✓ | | | | | | | ✓ | |

SOURCE NODE

SYSTEM AND METHOD FOR NETWORK OPTIMIZATION USING CODE BLOCKING

DESCRIPTION

1. Technical Field of the Invention

The invention relates to telecommunications network management, and more particularly, to a technique for enhancing revenues in a telecommunications network operating near or beyond its design capacity.

2. Description of Related Art

The demand for telecommunications services has been growing at an ever-increasing rate. In order to meet this demand, telecommunications network operators and suppliers have had to continuously upgrade the traffic carrying capacity of both their circuits as well of as the switch nodes interconnecting those circuits. In order to manage the growth in the demand for telecommunications services, network operators have continuously sought to increase the efficiency and utilization of network resources. Consequently, there has been a long-felt need for network management tools that can assist in enhancing network efficiency.

Congestion is one of the principal problems of network management. Since congestion results in fewer call attempts being successful, it lowers overall network revenues. Furthermore, under congestion conditions, network resources are often wasted on non-revenue generating (and often fruitless) tasks, e.g., in attempting to set up a call to a terminating number in a congested area.

The traditional technique for countering the effects of network congestion has been to re-route calls away from congested links. However, re-routing and other similar network congestion management techniques suffer from a number of disadvantages. For example, re-routing does not work well when the entire network is overloaded. Such overloads can arise from the occurrence of localized catastrophes, such as a fire or an earthquake. Under such conditions, it has frequently been found that numerous callers all try to dial into a localized geographic region, causing network congestion and above-normal call failure rates.

Consequently, it have been found desirable to have network management tools that can increase revenue in an overloaded telecommunications network. It has additionally been desired that the revenue enhancement technique be both simple as well as efficient in its use of network resources. Furthermore, it would be useful for new techniques to work harmoniously with traditional network management tools and techniques.

SUMMARY OF THE INVENTION

Therefore, it is a primary object of the present invention to provide a fast and efficient system and method for managing a telecommunications network when transient conditions cause the actual traffic to become greater than the network capacity. The technique uses an algorithm to automatically generate a close approximation of the optimum working state of a telecommunications network under traffic overload conditions.

The algorithm uses traffic blockage measurements obtained from distributed network switches and generates code blocking parameters that can be applied to the distributed network switches to enhance total revenue. The described technique provides additional revenue gains over that obtainable by partially rerouting traffic away from congested network links. The use of the described code blocking technique may be discontinued when the conditions causing the network overload are determined to have disappeared.

One embodiment of the present invention is operative on a telecommunications network having several switching nodes or exchanges that are interconnected by telecommunications links or trunks. Each link carries traffic originating from a traffic source to a specific destination node. First, the call blocking ratio for a specific traffic source in the telecommunications network is obtained by measurement. Next, the code blocking parameters for the traffic source is set to exactly one-half of the measured call blocking ratio for that traffic source.

Another embodiment of the present invention is operative to manage congestion in a telecommunications network having one or more switching nodes or exchanges that are interconnected by telecommunications links or trunks. Each link carries traffic originating from a specific traffic source to a specific destination node.

The process begins with the detection of congestion on one or more of the links that interconnect the nodes of the network by monitoring the traffic over the links. Next, the traffic that would ordinarily be carried on a congested telecommunications link is partially or completely rerouted over other noncongested links till the total network traffic cannot be increased any further.

The call blocking ratio is then measured for each of the traffic sources in the network. The state of each switching node or exchange on the source side of each of the congested links in said telecommunications network it then saved. The traffic over the network is next optimized to maximize revenue by setting the code blocking parameters of each traffic source to exactly one-half of the measured call blocking ratio for that traffic source.

The condition of the network is then monitored till the conditions causing the congestion come to an end. Finally, the state of each node on the source side of each of the congested links in the network is restored to its preoptimized state using state information stored earlier.

BRIEF DESCRIPTION OF THE DRAWINGS

A more complete understanding of the method and system of the present invention may be obtained by reference to the detailed description of the preferred embodiment that follows, taken in conjunction with the accompanying drawings, wherein:

FIG. 8 lists the connection topology of the 14-node PSTN network of FIG. 7 in tabular form;

DESCRIPTION OF THE PREFERRED EMBODIMENT

Telecommunications Networks

Figure 1:
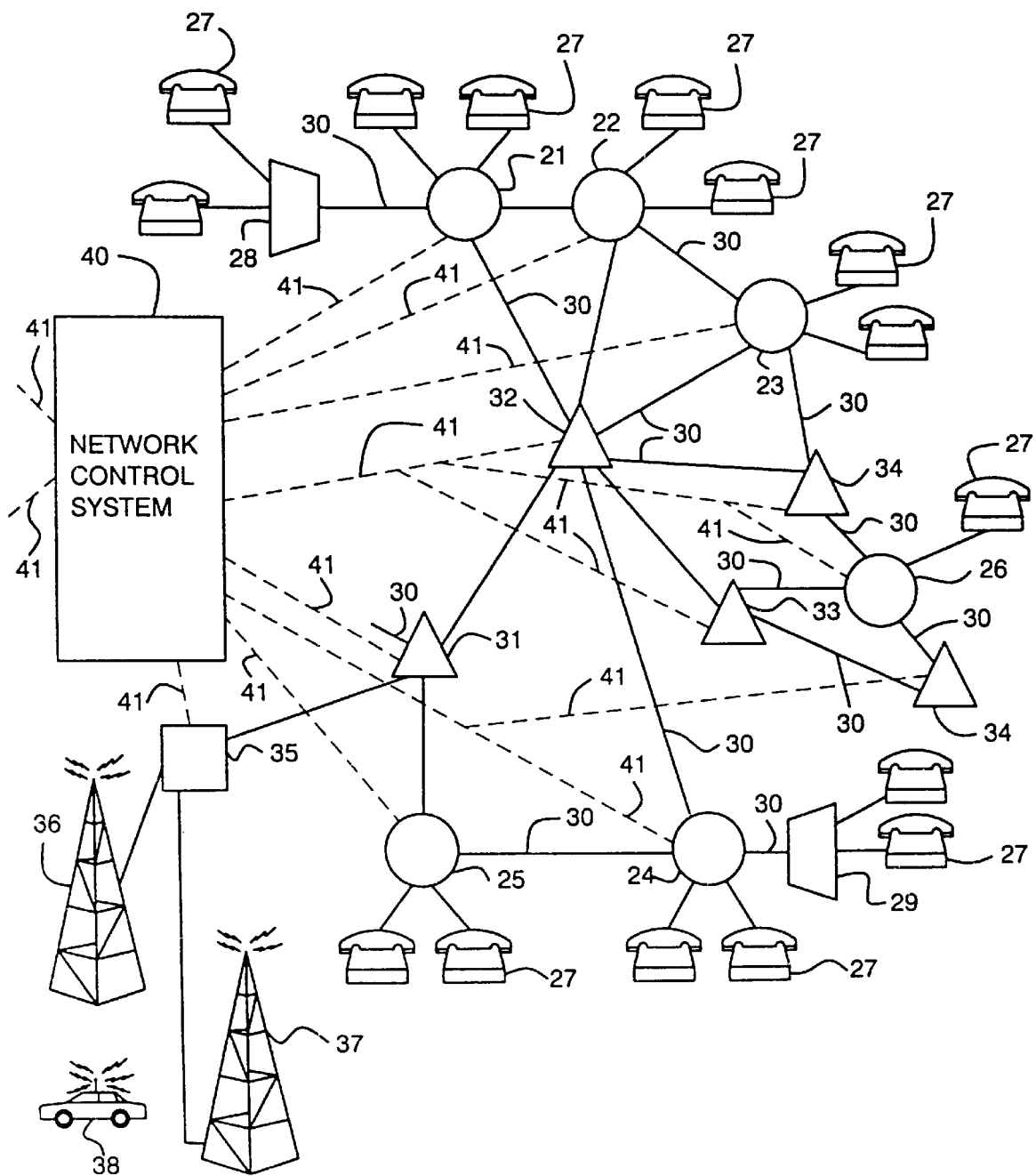
FIG. 1 is a block diagram of an illustrative telecommunications network within which the network optimization algorithm of the present invention may be employed.

Referring first to FIG. 1, there is shown an illustrative schematic diagram of a conventional public telecommunications network including a plurality of local exchanges 21 to 26, each of which have a plurality of local subscribers connected thereto and represented by telephone instruments 27. Two of the local exchanges 21 and 24 are represented as having remote subscriber multiplex stages 28 and 29 associated therewith which, in turn, have local customers 27 connected thereto. The network of FIG. 1 also includes a plurality of trunking exchanges 31 to 34 which serve primarily to interconnect various local exchanges with one another and to provide routes between various parts of the network. Trunk exchange 31 is shown connected to a mobile exchange 35 which includes a pair of illustrative base stations 36 and 37 serving a plurality of mobile radio telephone subscribers represented at 38.

In addition, other telecommunications services such as databases and intelligent networks may also be connected to various ones of the exchanges shown. Between each of the exchanges 21 to 35 in the network, there are shown a plurality of communication paths 30, each of which may comprise a plurality of communication circuits, including cables, optical links or radio links for carrying voice and/or data communication between the various exchanges within the network.

The network of FIG. 1 also includes a network control system 40 which is connected to each of the exchanges 21 to 35 within the network by means of communication links 41 (represented by dotted lines) for the transmission of control signals to each exchange and for the reception of traffic data from each exchange. The network control system 40 issues commands to dynamically reconfigure the communication paths within the various traffic routes of the network as well as to control the alarm systems within the exchanges of the network in order to fine tune the alleviation of congestion conditions within the network.

Terminology

Prior to a detailed consideration of the invention, it would be useful to define some of the terminology used in this patent application:

Carried Traffic: The carried traffic is the traffic served by a pool of resources.

Offered Traffic: The offered traffic is the traffic demand when the pool of network resources is infinitely large.

Effective Traffic: The effective traffic is the traffic corresponding to the conversational portion of effective call attempts.

Overflow Traffic: The overflow traffic is the part of the offered traffic to a pool of resources which is not carried by that pool of resources.

Blocked Traffic: The blocked traffic is that part of the overflow traffic that is not carried by subsequent pools of resources.

Abandoned Traffic: The abandoned traffic is that part of the blocked traffic which does not result in reattempts.

Suppressed Traffic: The suppressed traffic is the traffic that is withheld by users who anticipate a poor Quality of Service (QoS) performance.

Traffic Source: A Traffic Source is an abstract object in a telecommunications network that represents the total amount of traffic generated in a specific region of the network that is directed towards a defined destination area in the network.

Call Blocking: Calls may be blocked in a telecommunications network due to both endogenous and exogenous conditions. The former, referred to as internal blocking, occurs when a connection cannot be made between a given point in a network and any suitable idle resource in an external pool of resources owing to call congestion within the portion of the network under consideration. The latter, referred to as external blocking, occurs when a connection cannot be made between a given point in a network and any suitable resource in an external pool of resources owing to call congestion within the pol of resources.

Call Blocking Ratio: The Call Blocking Ratio is the ratio of call attempts generated by a traffic source that cannot reach their required destination due to a lack of network resources. Most commonly, call blocking results from either network congestion or call failure. Call blocking is also referred to as end-to-end blocking, see, ITU-T RECOMMENDATION E.600 entitled TERMs AND DEFINITIONS OF TRAFFIC ENGINEERING (ITU, March 1995).

Code Blocking: Code Blocking is a network management tool for immediate control of focussed overloads or mass-calling situations. It is used to manage network congestion by preventing a calculated fraction of the traffic directed towards a specific destination from entering the network. See, CCITT (ITU) RECOMENDATION E.412 entitled NETWORK MANAGEMENT CONTROLS: TELEPHONE NETWORK AND ISDN QUALITY OF SERVICE, NETWORK MANAGEMENT AND TRAFFIC ENGINEERING (ITU, October 1992).

Code Blocking Parameters: Code Blocking Parameters define the ratio of calls that must be refused at each traffic source. Code Blocking Parameters can be set on a country code, an area code, an exchange identifying code or, most selectively of all, even on an individual line number.

The Problem

Figure 2:
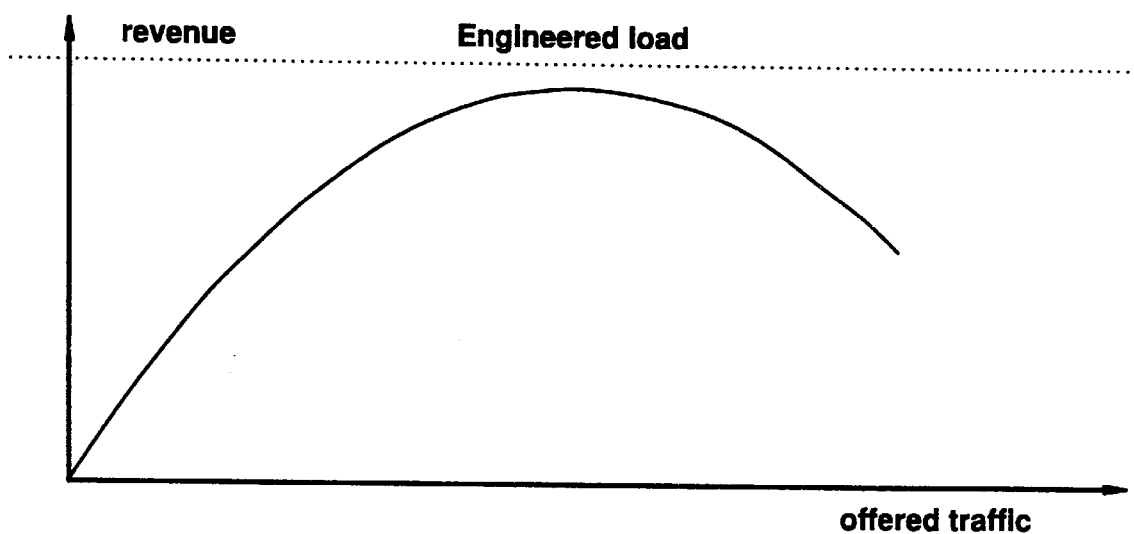
FIG. 2 is an exemplary network throughput curve showing the relationship between network revenue and offered traffic in a telecommunications network.

It has been found in telecommunications networks that the total carried traffic (and consequently the revenue) in the network initially increases with an increase in the offered traffic. However, if the offered traffic increases beyond a certain level, the total carried traffic (as well as the revenue) in the network has been found to decrease. This is sometimes referred as the "breakdown effect" and is illustrated in FIG. 2. The system and method of the present invention presents a solution to this common problem in telecommunications networks.

When a telecommunications network becomes overloaded and is faced with load that is greater than the optimal amount (leading to a loss of revenue), one way to enhance revenue is by decreasing the offered traffic using the code blocking technique. However, such a choice immediately raises the subsidiary question of how to calculate the appropriate code blocking parameters for the various switches in the distributed telecommunications network? The system and method of the present invention provides an easy but effective approximation to this question.

Operating Principle of the Proposed Solution Technique

The principle underlying the proposed algorithm is easy to explain. Assume that we have an overloaded network. Assume also that the call blocking ratio for each switching node or exchange can be computed and monitored from a central location. Assume further that all the traffic sources in the network are code blocked in the same proportion as the current measured call blocking ratio for that traffic source. This is equivalent to discarding in advance the amount of traffic that would anyway have bene lost due to network congestion or internal blocking.

It would be clear to one skilled in the art that that part of the offered traffic which is not code blocked will now, to a first approximation, encounter no further congestion within the network. Thus, the carried traffic will be the same as it was before the application of code blocking. This is illustrated in FIG. 3 using the network throughput curve depicted in FIG. 2 as a template.

Note that by defining the code blocking at the same rate as the measured call blocking ratio, we obtain the same network revenue, $r_c$, as before application of code blocking, but the carried traffic, $t_c$, is lower than the offered traffic, $t_o$. As can be seen in FIG. 3, any level of carried traffic that lies between these two points will automatically result in higher revenue than $r_c$, the initial revenue in the congested network.

Figure 3:
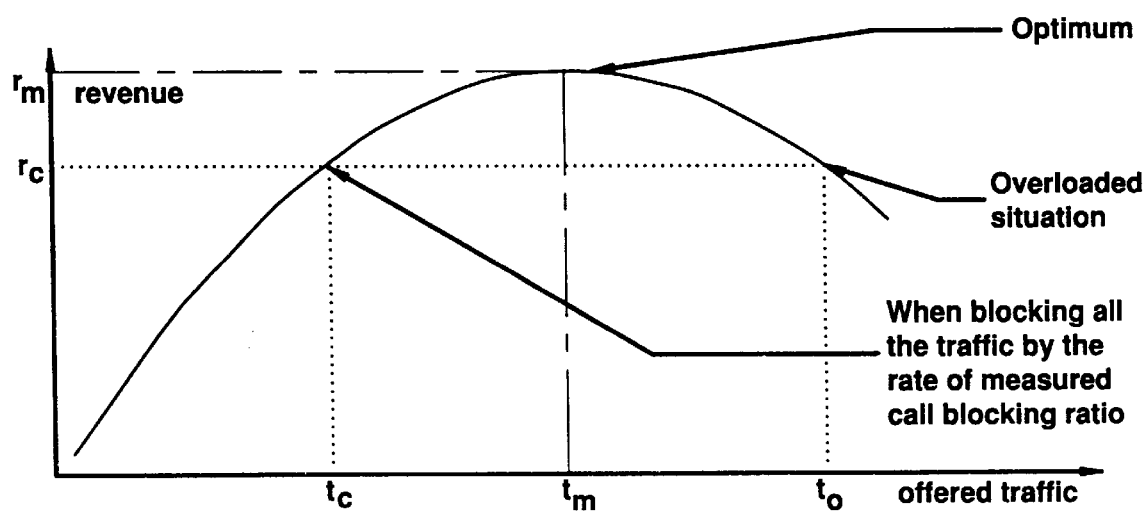
FIG. 3 shows the operating principle underlying the operation of the subject algorithm using the exemplary network throughput curve of FIG. 2 as a template.

It has been found that the revenue-vs.-traffic curve in actual telecommunications networks is symmetric around $t_m$, the operating point yielding the maximum network revenue, i.e., the actual revenue-vs.-traffic curve is similar to that shown in FIG. 3. Thus, the network revenue reaches its maximum, $r_m$, when the operating point lies exactly in the middle of the two points, to and to i.e. at $t_m$.

Overview of the Solution Algorithm

Figure 4:
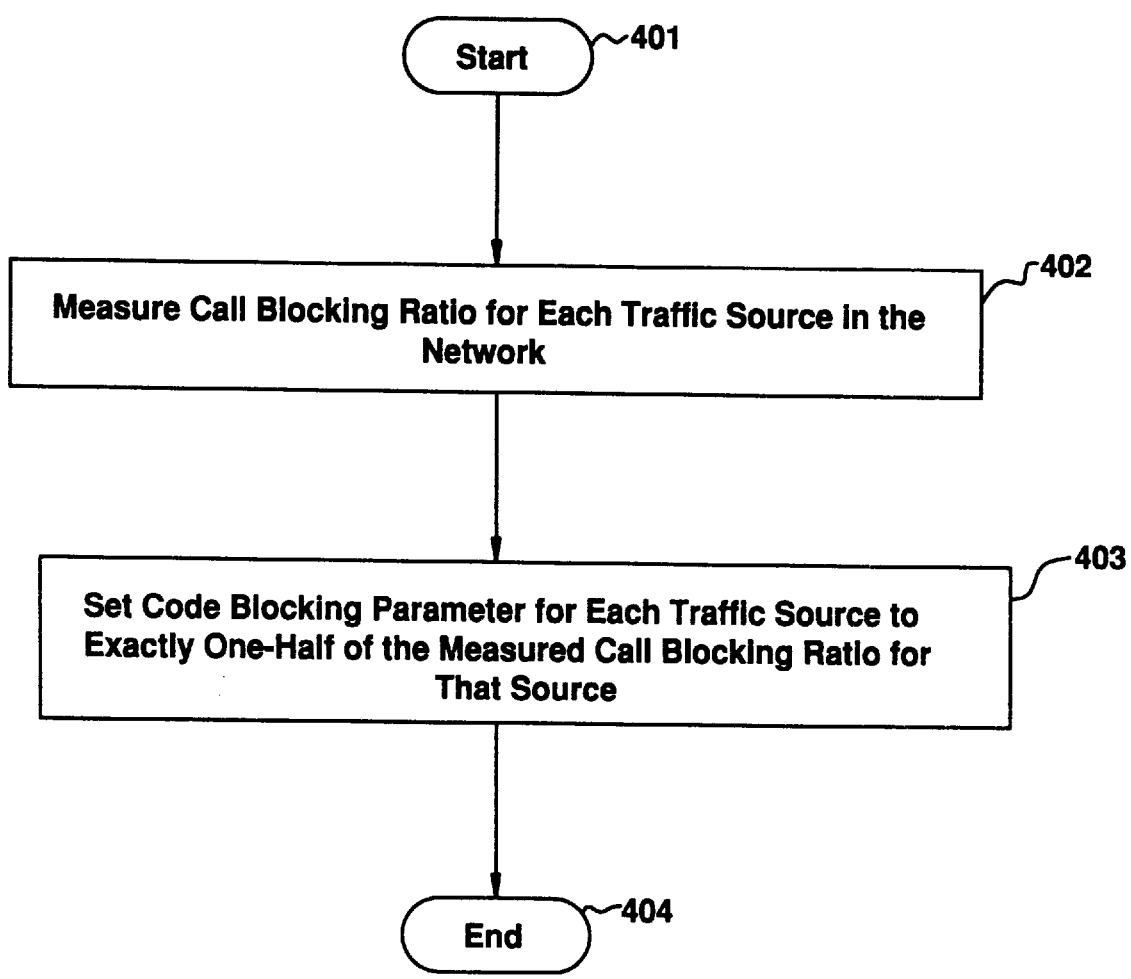
FIG. 4 is a flow chart providing an overview of the Code-Blocking Algorithm of the present invention.

It logically follows that the critical task in implementing the proposed algorithm is to set the carried traffic exactly at the midpoint of the $t_c$ and $t_o$ points shown in FIG. 3. In the preferred embodiment of the present invention, this is done as shown in the flow chart of FIG. 4.

The process starts at 401 and comprises two principal actions. First, at 402, the Call Blocking Ratio is obtained by measurement from each of the traffic sources in the telecommunications network. Next, at 403, the Code Blocking Parameters for each source in the network is set to exactly one-half of the Measured Call Blocking Ratio for that source. The process then ends at 404. It would be appreciated by those skilled in the art that this technique is equivalent to discarding, in advance, one-half of the total number of calls that would have been lost anyway due to network congestion.

Preferred Embodiment of the Solution Algorithm

Figure 5:
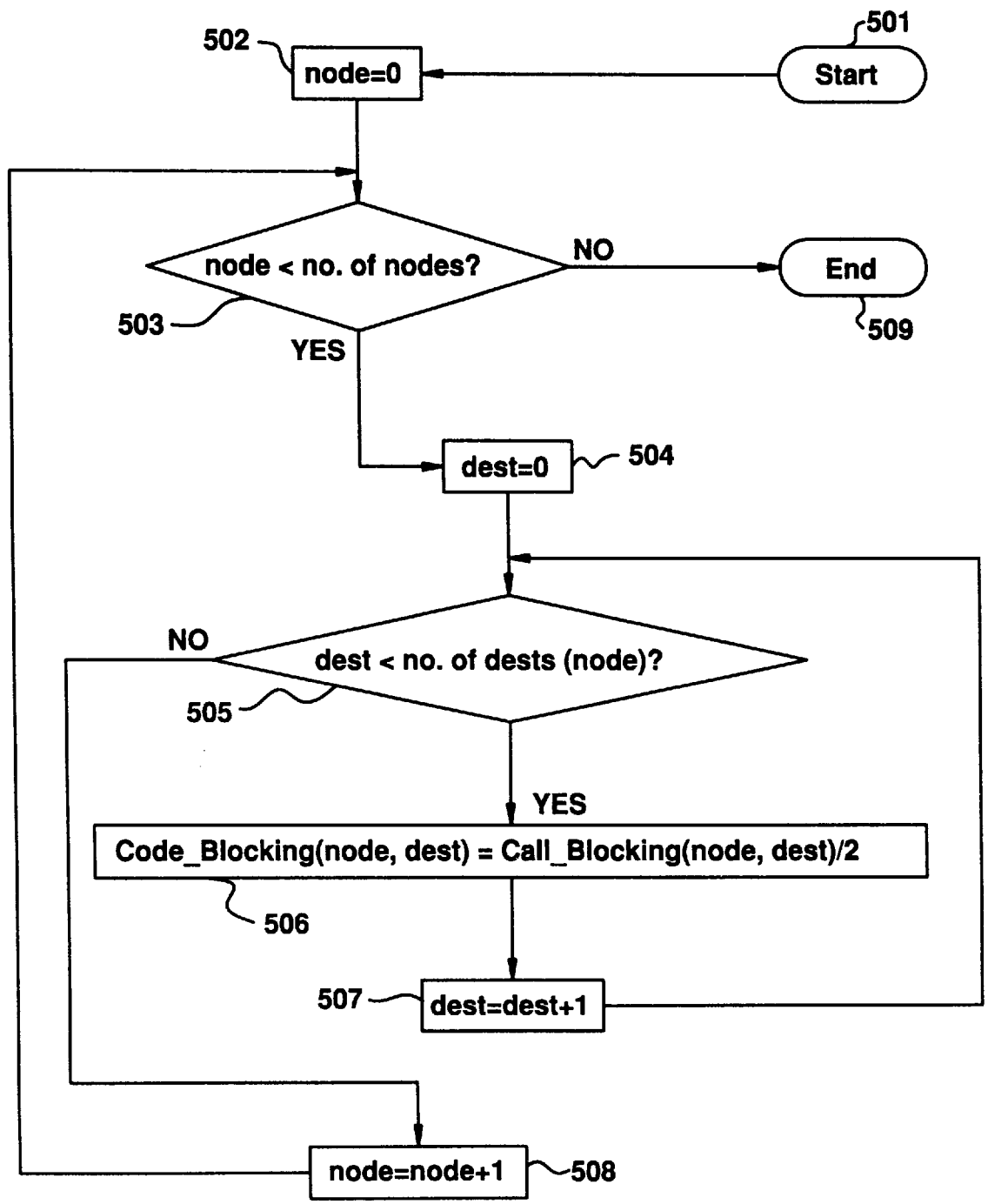
FIG. 5 is a flow chart detailing the various steps in the operation of preferred embodiment of the code-blocking network management algorithm of the present application.

The preferred embodiment of the network management algorithm that is the subject matter of the present invention is illustrated in the flow chart of FIG. 5. The process starts at 501 upon the detection of congestion in the network. It would be appreciated by those skilled in the art that network congestion can arise in several situations, e.g., increased calling intensity due to newsworthy events in a localized area, partial or total hardware failure, etc.

The process shown in FIG. 5 consists of two nested loops. The outer nested loop, shown at steps 502 through 508, is directed at repeating the solution algorithm over all the switching nodes or exchanges in the telecommunications network. These switching nodes or exchanges are analytically equivalent to the traffic sources that are to be managed by the algorithm of the present invention. The inner nested loop, shown at steps 504 to 507, is directed at computing the appropriate code blocking parameters for each traffic source in the network.

First, a source node counter is initialized at 502. Next, the current value in the source node counter is compared, at 503, to the prespecified total number of source nodes in the network. If the value in the node counter is greater than the total number of source nodes in the network, the process terminates at 509. As long as the value in the node counter is less than or equal to the total number of source nodes in the network, the process continues to step 504 where the destination node index for a specific source node is first initialized.

Next, the current value in the destination node counter is compared, at 505, to the prespecified total number of destination nodes in the network that are connected to the source node currently under consideration. If the value in the destination node counter is greater than the total number of destination nodes connected to the source node under consideration, the inner loop terminates and proceeds to step 508.

As long as the value in the destination node counter is less than or equal to the total number of destination nodes for the source node in question, the inner loop process continues to step 506. Preliminarily, the Call Blocking Ratio (or the End-to-End Blocking Ratio) of the originating traffic from the source node under consideration towards all destination nodes corresponding to the source node is measured at 506.

This step is not specifically illustrated in FIG. 5 as the blockage measurements need not be done as part of the operation of the subject algorithm. The Call Blocking Ratio can also be retrieved from a centralized database containing network status information. It should be emphasized that what is considered as the applicable destination nodes for a specific exchange or traffic source may depend on the abstraction level being used for network management and consequently can be defined in a variety of ways.

The Code Blocking Parameter for the source node under consideration towards each destination node is set, at 506, to exactly one-half of the Measured Call Blocking Ratio for that destination node. For example, if, say, 10% of the calls originating from source exchange A and directed at destination exchange B are blocked, the Measured Call Blocking Ratio of Traffic Source A for traffic on the link connecting exchanges A and B will be 10%. Consequently, using the system and method of the present invention, we set the Code Blocking Parameter in exchange A for calls originating in exchange A and having exchange B as their destination to one-half of 10%, i.e., to 5%.

This process is repeated for all destination nodes directly or indirectly linked to the source node under consideration by incrementing the destination node index counter at 507 and looping back to decision block 505. After completing this process for all origination-destination pairs corresponding to the source node under consideration, the process moves on to step 508 where the source node counter is incremented. The outer loop process then loops back to decision block 503 until the same operation has been repeated on all source nodes in the network.

It should be noted that the system and method of the present invention can be applied to enhance revenue of any overloaded circuit-switched network that has the symmetric revenue characteristic illustrated in FIGS. 2 & 3, regardless of the reasons why the network possesses such a characteristic.

Network Management Using the Code Blocking Technique

The preceding description has only addressed the principle of operations of the system and method of the present invention. We will next explore other aspects relevant to the implementation and use of the subject invention in an actual telecommunications network. While most such aspects such as techniques and procedures for detecting congestion in a telecommunications network, etc., are well known to those of ordinary skill in the art and do not merit reiteration, we will briefly discuss a few of the more important network management issues such as re-routing since they may impact upon the operation of the subject invention.

Rerouting: It would be unusual if all links of a telecommunications network simultaneously reached their design capacity. It is more often true that some links of a telecommunications network become congested before other links. In fact, congestion in a circuit switched network is often a gradual process, with more and more links becoming overloaded as the offered traffic is gradually increased. Hence, it has been traditional network management practice to minimize the effects of network congestion by re-routing calls away from congested links. Re-routing has long been the preferred technique for ameliorating network congestion.

It should be emphasized that the system and method of the present invention can be applied to enhance network revenue over and above gains realizable by application of re-routing. Thus it is preferable, though not necessary, that the system and method of the present invention be used in conjunction with other network management techniques such as re-routing.

It has been found that the system and method of the present invention yields the best results when used subsequent to re-routing. Thus the first step in managing network congestion is to try re-routing till no more significant revenue increase can be achieved by traffic re-routing. However, it should be noted that it is usually advisable to try re-routing before trying any other network optimization technique whether based on Code Blocking or on any other restrictive measures.

Figure 6:
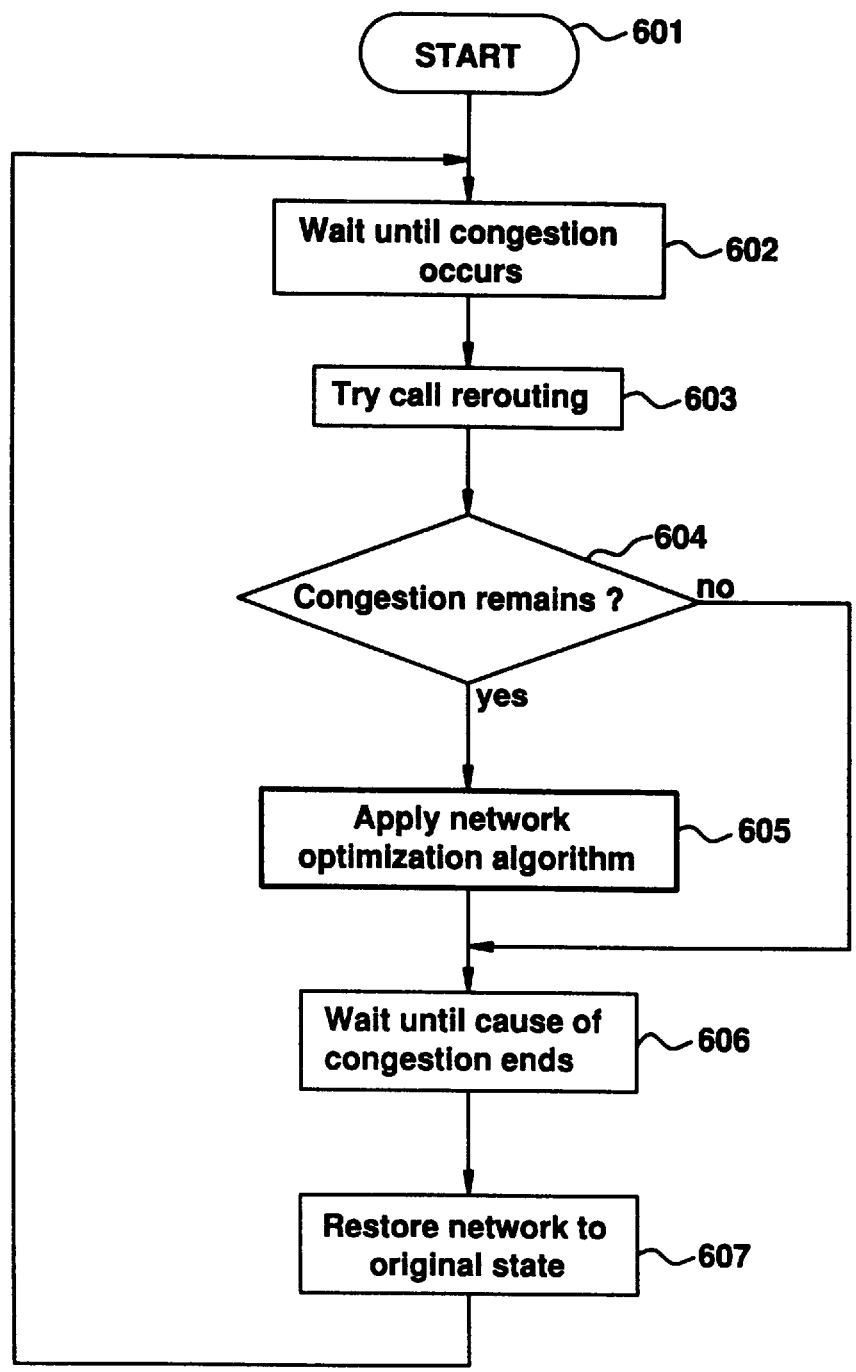
FIG. 6 is a high-level block diagram showing the conjunctive operation of the code-blocking algorithm of the present invention with traditional network optimization techniques such as re-routing.

FIG. 6 is a high-level block diagram showing the conjunctive operation of the code-blocking algorithm of the present invention with traditional network optimization techniques such as re-routing. The network management process starts at 601 with the arming of a congestion detection trigger. The process then moves to a quiescent state till network congestion is detected at 602. Traditional congestion control techniques such as call re-routing are applied to the problem as shown at 603 until marginal revenue gains become nonpositive.

It should be emphasized that the use of re-routing in step 603 is purely optional and exemplary. Depending on the actual circumstances, a network operator may choose to apply other network management techniques or may even elect to proceed straight to the next stage of the management process shown in FIG. 6.

The next step is to monitor the continued existence of network congestion as shown at 604. Although the application of the algorithm of the present invention even in the absence of network congestion will not cause any degradation in the throughput or performance of the network, the unnecessary execution of the algorithm would obviously utilize network resources inefficiently.

If continued network congestion is detected at 604, the state of the network switches is stored for later retrieval, and then the network optimization algorithm of the present invention is applied at 605. The details of operation of the subject algorithm can be obtained by reference to the earlier discussion of FIGS. 4 & 5.

After the application of the code blocking algorithm of the present invention, another congestion trigger is armed at 606. The system remains in its code-optimized state, as shown at 606, until the conditions causing the network congestion are determined to have ended. When it is determined that the former congestion condition in the network is no longer present, the network is restored to its original (pre-code-optimized) state that was stored as part of step 605. The network management process then loops back to the starting state 601 and the whole process starts all over again as detailed above.

It should be emphasized that the system and method of the present invention is potentially very broad in scope. The code blocking network optimization technique detailed in this patent application can be applied to any part of a telecommunications network that is impacted by congestion, e.g., a single exchange, a part of the network such as an area code, or even to the whole network.

Extension to Data and Packet-Switched Networks

The system and method of the present invention can also be extended for use in Asynchronous Transfer Mode (ATM) networks. The subject invention can be applied to the optimization of ATM systems at both the connection-level as well as at the cell-level. At the connection-level, ATM-based circuits are referred to in terms of Virtual Paths (VPs) and Virtual Channels (VCs).

At the connection-level, the code blocking algorithm detailed in the present patent application can be applied to optimize the performance and enhance the revenue of an ATM system. In fact, the code blocking algorithm can be used in any telecommunication network that involves connection setup along with resource reservation, because such networks are likely to exhibit the phenomenon of network revenue decreasing with increasing offered traffic. Needless to say, the subject technique will need to be adapted to the needs of the application.

It should be noted that in the connection-oriented case, the basic reason for the decrease in revenue with increasing offered traffic is due to the fact that system resources are used in the call-setup phase even for calls that are not completed. The negative slope of the revenue-vs.-traffic curve beyond the optimal traffic load derives from the fact that calls that are lost or not completed do not provide any network revenue.

At the cell-level, the treatment of ATM channels can be classified into controlled traffic channels and discretionary traffic channels. Controlled traffic refers to traffic that is controlled using cell-level traffic management mechanisms. In such instances, as is the case with Constant Bit Rate (CBR), Variable Bit Rate (VBR) and Available Bit Rate (ABR) traffic, the loss of ATM cells is prespecified in probabilistic terms.

Consequently, with controlled traffic channels, traffic overloads will cause problems only at the connection-level and not at the cell-level. Thus only the Grade of Service will be affected by transient or short-term traffic overloads, while the contracted-for Quality of Service (QoS) will be maintained by the Traffic Management and Usage Parameter Control mechanisms specified in the ATM standards.

In the case of discretionary traffic channels, there is no guarantee against the loss of ATM cells belonging to a specific connection. Consequently, with discretionary traffic channels, an increase in user traffic at the cell-level may result in a similar phenomenon as in the connection-oriented case illustrated in FIGS. 2 & 3. It now becomes a possibility that ATM cells that may themselves be discarded at a later node may "bump out" ATM cells at an earlier node along their way, that actually had a great probability of reaching their eventual destination. A similar phenomenon is also possible in packet-switching networks. So, the system and method of the present invention can be applied to both situations, after the necessary adaptation to the needs of the application.

Results of Simulations

Several software simulation tests have been performed to prove the accuracy of the present inventions as well as the validity of the underlying assumptions. A Public Switched Telephone Network (PSTN) network simulator was used for the tests. First, the network revenue curves were measured for some test networks. These revenue-vs.-traffic curves were found to be closely symmetric, as assumed in the subject algorithm. Next, simulated conditions corresponding to network overloads were generated and the system and method of the present application was applied to these situations. The simulations yielded satisfactory results. In most cases, the code-blocking algorithm restored network revenue to its pre-congestion (maximum) level.

One way to rigorously prove the accuracy and efficiency of a network optimization algorithm such as the one proposed in the present patent application is by field tests. However, it is difficult to obtain permission to run tests of experimental algorithms on real working networks, and hence the best available technique for validation of network management algorithms is by software simulation. Accordingly, it has become the practice in telecommunications network management to validate new control algorithms using network simulators. This approach permits experimental algorithms to be tested economically and without running the risk of service disruptions.

The principal goal of the simulations exercises was to test the validity of the key assumption underlying the code-blocking algorithm, i.e., that the network throughput function (the revenue) is closely symmetric with respect to the carried traffic near the maxima of the network revenue function. A simulated field test showing the benefits of the code-blocking algorithm also appears in this patent application.

Figure 7:
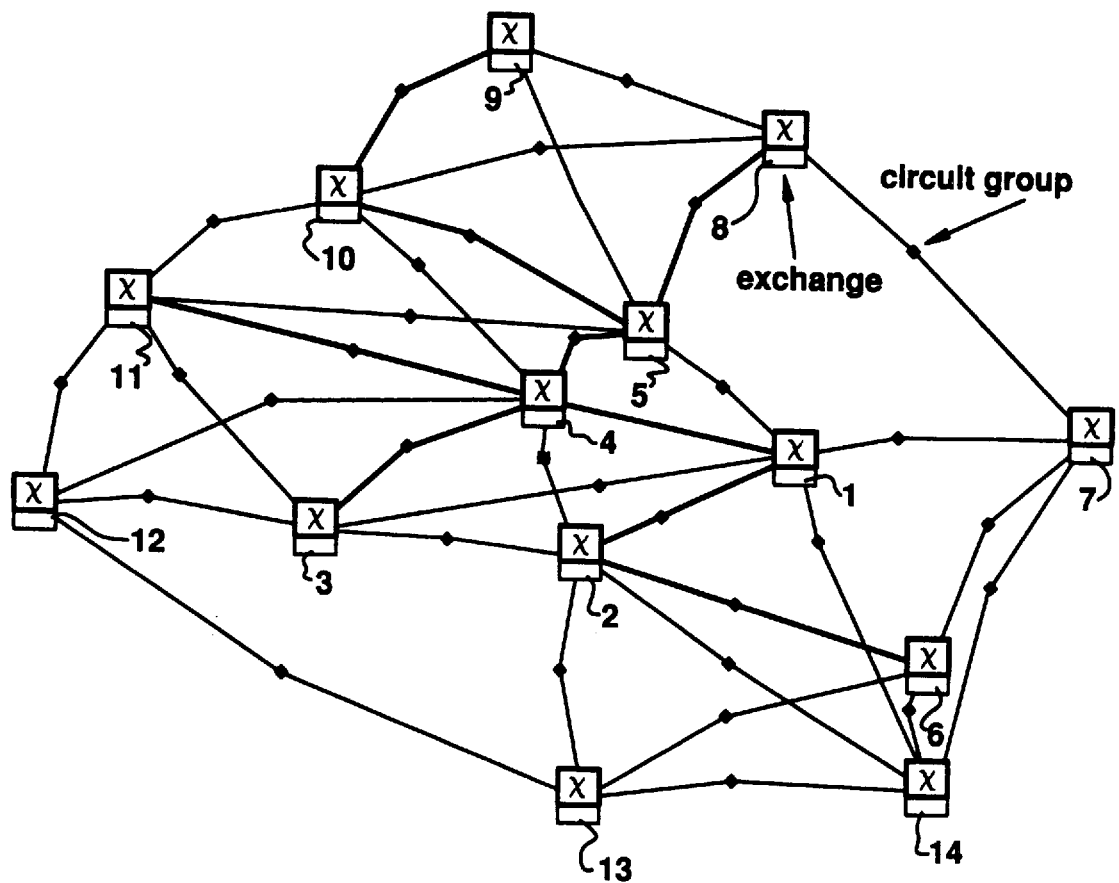
FIG. 7 depicts an exemplary 14-node PSTN network that was used as a simulation test-bed for validating the underlying assumptions and gauging the effectiveness of the code-blocking algorithm of the present invention.

The algorithm validation tests were performed using the PLASMA PSTN network simulator developed at Ericsson's Traffic Analysis and Network Performance (TRAFFIC) Laboratory. The simulations were run on the 14-node PSTN network shown in FIG. 7.

The connection topology of the 14-node test network is depicted in FIG. 8 as a table, with the links between the 14 numbered nodes being indicated by check marks ("✓")and "T" signs. The check marks indicate the existence of an ordinary (direct) link between the appropriate source and destination node pair. The "T" sign denotes that the existence of a high-capacity (trunk) link between the appropriate source and destination node pair. It should be noted that the network topology shown in FIG. 8 is symmetric since each of the links is assumed to be bidirectional.

In the test network, traffic is assumed to originate from each node towards all the other nodes connected to it, except for those nodes that are considered to be "backbone" nodes, (i.e., nodes 1, 2, 4, 5, 7). The capacities of the circuit groups (links) are not shown in FIG. 8 since they are not relevant to the description and understanding of the subject method.

Although the PLASMA simulator is capable of measuring several different network parameters, the present analysis for demonstrating the behavior of the network uses only one of these parameters, i.e., Network Revenue. This parameter can be defined as:

$$\text{Revenue} = \frac{\text{Income}}{\text{Time}}$$

Thus Network Revenue has dimensions of Currency Unit/ Time Unit (e.g., $/hour) . This has not been shown on the following graphs, since the choice of the currency unit is not relevant to the simulation study. Furthermore, it has been assumed that network pricing structure is constant over all time periods and distances. It should be noted that other pricing models are also becoming increasingly common, e.g., distance-based pricing, time-of-day pricing, flat-rate pricing, volume pricing, etc.

Simulation Results for PSTN Network Throughput: The first step in the validation of the algorithms is to measure the throughput curve of the exemplary 14-node PSTN network that is currently under test. This test was performed by monotonically increasing the total offered traffic to the network step-by-step (moving along the x-axis) and determining the resulting network revenue at each step using the simulator. The results are displayed in FIG. 9.

Figure 9:
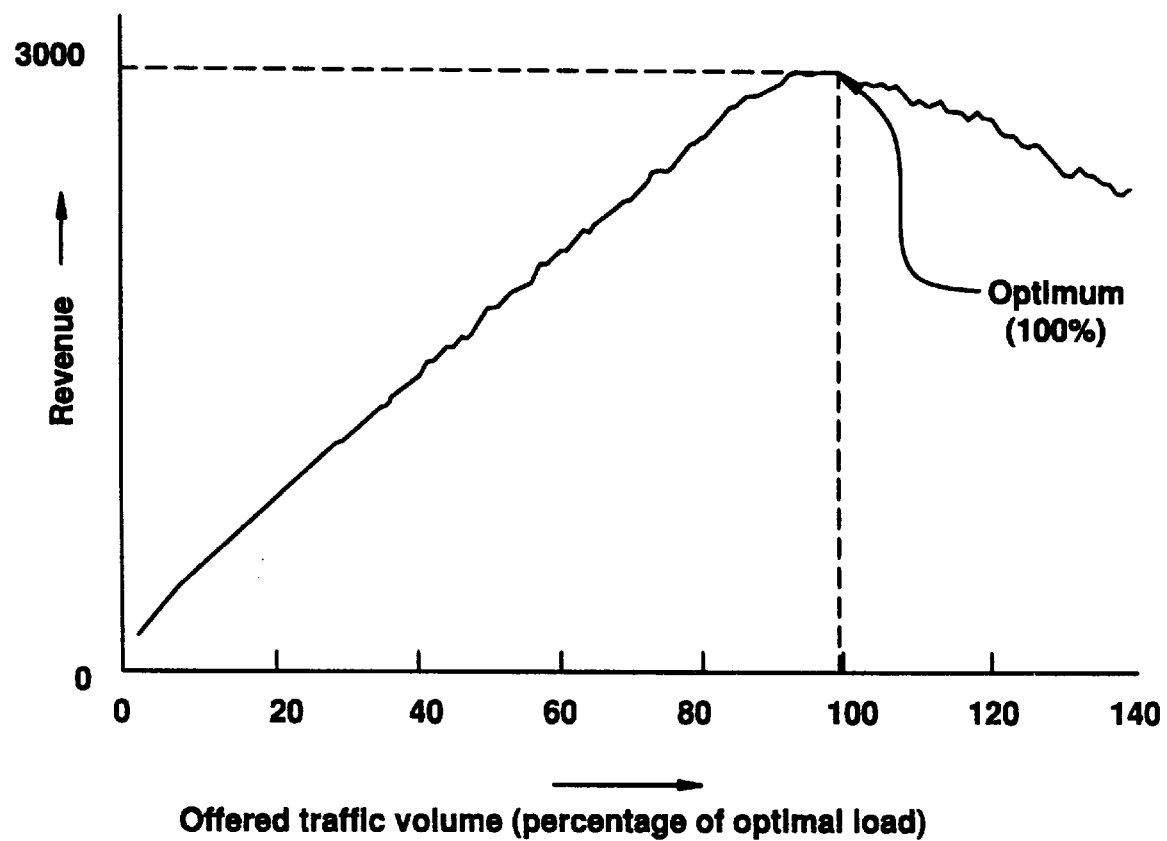
FIG. 9 shows the simulation results for the network throughput of the 14-node PSTN network of FIG. 7.

It is clear from an analysis of FIG. 9 that the revenue-vs.-traffic curve is very close to being symmetric—at least around the point of maximum revenue, i.e. in the region of interest to us.

As explained earlier, the reasons for the decrease in network revenue with an increase in the offered traffic arises from the inefficient use of network resources for the attempted setup of calls that are later not completed. Since unsuccessful calls do not generate any network revenues under most access-pricing models, the use of network resources for setting up calls results in negative marginal revenues.

Figure 10:
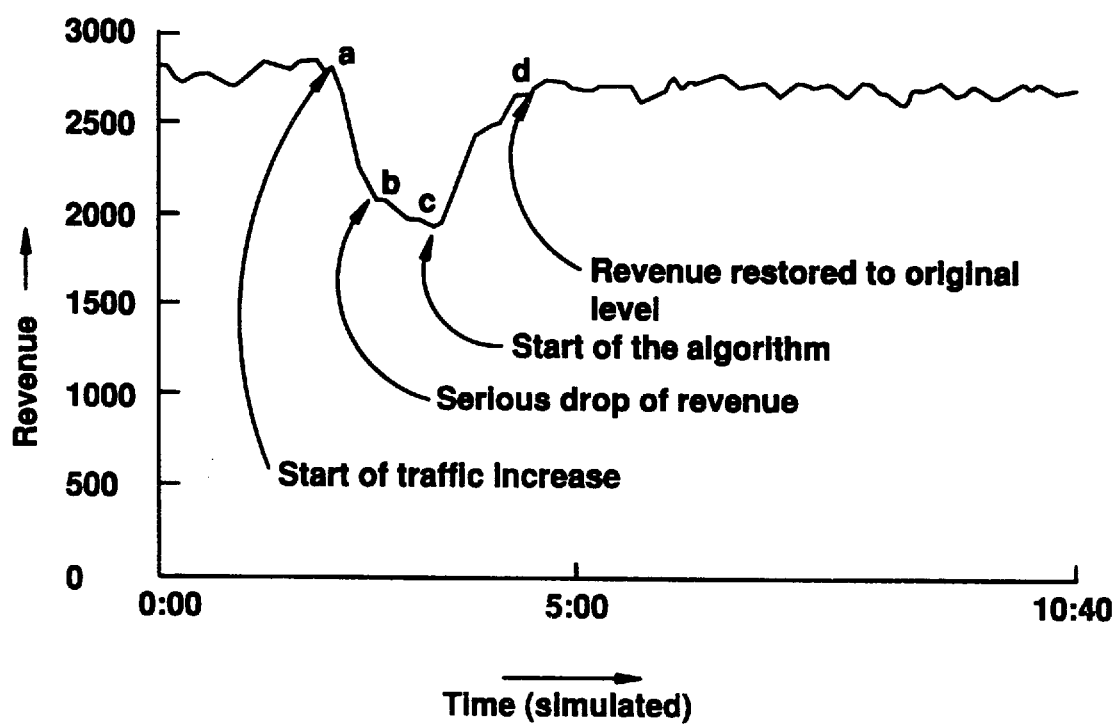
FIG. 10 is a time-revenue chart showing the simulation results for the effectiveness of the code-blocking algorithm in enhancing revenue in an overloaded network.

Simulation Results for Network Performance Impact: In the second phase of the validation process, a simulated field test was carried out on the same 14-node test network shown in FIG. 7. The simulation was carried out in four stages as shown in FIG. 10 and detailed below.

The simulation begins with the offered traffic being steadily increased till the network revenue reaches a relatively stable maximum value. This is shown at the point marked "a" in FIG. 10. Now, the offered traffic to the test network is suddenly increased by a large amount. It should be noted that this is a common problem in telecommunications networks that may be caused by a variety of unexpected events e.g., a localized disaster may cause a sudden sharp increase in the traffic demand. As a result, the offered traffic to the network goes beyond its maximum point, causing the network revenue to drop sharply, as shown at the point marked "b" in FIG. 10.

Upon detection of the overload, the code-blocking algorithm is activated to attempt enhancement of the network throughput and revenue. This is shown at the point marked "c" in FIG. 10. As can be observed from the simulated time-revenue chart of FIG. 10 that as a result of the application of the code-blocking algorithm, the network revenue increases almost back to its original level. This is shown at the point marked "d" in FIG. 10.

Thus the simulation exercise clearly proves the efficient operation of the code-blocking algorithm for its intended purpose. The network simulation demonstrates that the throughput characteristics of PSTN networks are symmetric, thus validating the principal assumption underlying the code-blocking algorithm detailed in the present application. Furthermore, the simulation also proves that the algorithm works well in the face of an unexpected increase in traffic, thus immediately ameliorating and later eliminating the serious degradation in network performance that would otherwise result.

Although a preferred embodiment of the method and apparatus of the present invention has been illustrated in the accompanying drawings and described in the foregoing detailed description, it is to be understood that the invention is not limited to the embodiment(s) disclosed, but is capable of numerous rearrangements, modifications and substitutions without departing from the spirit of the invention as set forth and defined by the following claims.

What is claimed is:

1. An efficient method for maximizing revenues in a telecommunications network comprising a plurality of switching nodes or exchanges interconnected by telecommunications links or trunks for carrying traffic originating from a plurality of traffic sources to a plurality of destination nodes, said method comprising the steps of:

measuring the call blocking ratio for a specific traffic source in said telecommunications network; and setting the code blocking parameters for said traffic source to exactly one-half of the measured call blocking ratio for that traffic source.

2. The efficient method for maximizing revenue in a telecommunications network of claim 1 wherein said step of measuring the call blocking ratio for a specific traffic source in said telecommunications network is done in real time in response to a command from an invoking software module.

3. The efficient method for maximizing revenue in a telecommunications network of claim 1 wherein said step of measuring the call blocking ratio for a specific traffic source in said telecommunications network is done additionally comprises the step of accessing a stored network status database.

4. The efficient method for maximizing revenue in a telecommunications network of claim 1 comprising the additional step of partially rerouting traffic that would otherwise be carried on a congested telecommunications link over other noncongested links till total network traffic cannot be increased any further.

5. The efficient method for maximizing revenue in a telecommunications network of claim 1 wherein said traffic source is a single exchange.

6. The efficient method for maximizing revenue in a telecommunications network of claim 1 wherein said traffic source is a part of the network.

7. The efficient method for maximizing revenue in a telecommunications network of claim 1 wherein said traffic source is the entire network.

8. An efficient method for managing congestion in a telecommunications network comprising a plurality of switching nodes or exchanges interconnected by telecommunications links or trunks for carrying traffic originating from a plurality of traffic sources to a plurality of destination nodes, said method comprising the steps of:

detecting the existence of congestion on one or more telecommunications links interconnecting the switching nodes or exchanges in said telecommunications network by monitoring the traffic over said telecommunications links;

partially rerouting traffic that would otherwise be carried on a congested telecommunications link over other noncongested links till total network traffic cannot be increased any further;

measuring the call blocking ratio for each of the traffic sources in said telecommunications network;

saving the state of each switching node or exchange on the source side of each of the congested links in said telecommunications network;

optimizing the traffic over said telecommunications network by setting the code blocking parameters of each traffic source to exactly one-half of the measured call blocking ratio for that traffic source;

detecting the end of the congestion condition in the telecommunications network; and restoring the state of each switching node or exchange on the source side of each of the congested links in said telecommunications network to their pre-optimized state using the switch state information that was stored earlier.

9. The efficient method for managing congestion in a telecommunications network of claim 8 wherein said telecommunications network is a connection-oriented network.

10. The efficient method for managing congestion in a telecommunications network of claim 8 wherein said telecommunications network is an Asynchronous Transfer Mode (ATM) network.

11. The efficient method for managing congestion in a telecommunications network of claim 8 wherein said telecommunications network is a packet-switching network.

12. An efficient method for managing congestion in a connection-oriented telecommunications network that comprises a plurality of switching nodes or exchanges interconnected by telecommunications links or trunks for carrying traffic originating from a plurality of traffic sources to a plurality of destinations, said method comprising the steps of:

detecting the existence of congestion on one or more telecommunications links interconnecting the switching nodes or exchanges in said connection-oriented telecommunications network by monitoring the traffic over said telecommunications links;

partially rerouting traffic that would otherwise be carried on a congested telecommunications link over other noncongested links till total network traffic cannot be increased any further;

measuring the call blocking ratio for each of the traffic sources in said telecommunications network;

saving the state of each switching node or exchange on the source side of each of the congested links in said telecommunications network;

optimizing the traffic over said telecommunications network by setting the code blocking parameters of each traffic source to exactly one-half of the measured call blocking ratio for that traffic source;

detecting the end of the congestion condition in the telecommunications network; and restoring the state of each switching node or exchange on the source side of each of the congested links in said telecommunications network to their pre-optimized state using the switch state information that was stored earlier.

13. An efficient system for maximizing revenues in a telecommunications network comprising a plurality of switching nodes or exchanges interconnected by telecommunications links or trunks for carrying traffic originating from a plurality of traffic sources to a plurality of destination nodes, said system comprising:

means for measuring the call blocking ratio for a specific traffic source in said telecommunications network; and means for setting the code blocking parameters for said traffic source to exactly one-half of the measured call blocking ratio for that traffic source.

14. The efficient system for maximizing revenue in a telecommunications network of claim 13 wherein said means for measuring the call blocking ratio for a specific traffic source in said telecommunications network performs its operation in real time in response to a command from an invoking software module.

15. The efficient system for maximizing revenue in a telecommunications network of claim 13 wherein said means for measuring the call blocking ratio for a specific traffic source in said telecommunications network further comprises means for accessing a stored network status database.

16. The efficient system for maximizing revenue in a telecommunications network of claim 13 additionally comprising means for partially rerouting traffic that would otherwise be carried on a congested telecommunications link over other noncongested links till total network traffic cannot be increased any further.

17. The efficient system for maximizing revenue in a telecommunications network of claim 13 wherein said traffic source is a single exchange.

18. The efficient system for maximizing revenue in a telecommunications network of claim 13 wherein said traffic source is a part of the network.

19. The efficient system for maximizing revenue in a telecommunications network of claim 13 wherein said traffic source is the entire network.

20. An efficient system for managing congestion in a telecommunications network comprising a plurality of switching nodes or exchanges interconnected by telecommunications links or trunks for carrying traffic originating from a plurality of traffic sources to a plurality of destination nodes, said system comprising:

means for detecting the existence of congestion on one or more telecommunications links interconnecting the switching nodes or exchanges in said telecommunications network by monitoring the traffic over said telecommunications links;

means for partially rerouting traffic that would otherwise be carried on a congested telecommunications link over other noncongested links till total network traffic cannot be increased any further;

means for measuring the call blocking ratio for each of the traffic sources in said telecommunications network;

means for saving the state of each switching node or exchange on the source side of each of the congested links in said telecommunications network;

means for optimizing the traffic over said telecommunications network by setting the code blocking parameters of each traffic source to exactly one-half of the measured call blocking ratio for that traffic source;

means for detecting the end of the congestion condition in the telecommunications network; and means for restoring the state of each switching node or exchange on the source side of each of the congested links in said telecommunications network to their pre-optimized state using the switch state information that was stored earlier.

21. The efficient system for managing congestion in a telecommunications network of claim 20 wherein said telecommunications network is a connection-oriented network.

22. The efficient system for managing congestion in a telecommunications network of claim 20 wherein said telecommunications network is an Asynchronous Transfer Mode (ATM) network.

23. The efficient system for managing congestion in a telecommunications network of claim 20 wherein said telecommunications network is a packet-switching network.

24. An efficient system for managing congestion in a connection-oriented telecommunications network that comprises a plurality of switching nodes or exchanges interconnected by telecommunications links or trunks for carrying traffic originating from a plurality of traffic sources to a plurality of destinations, said system comprising:

means for detecting the existence of congestion on one or more telecommunications links interconnecting the switching nodes or exchanges in said connection-oriented telecommunications network by monitoring the traffic over said telecommunications links;

means for partially rerouting traffic that would otherwise be carried on a congested telecommunications link over other noncongested links till total network traffic cannot be increased any further;

means for measuring the call blocking ratio for each of the traffic sources in said telecommunications network;

means for saving the state of each switching node or exchange on the source side of each of the congested links in said telecommunications network;

means for optimizing the traffic over said telecommunications network by setting the code blocking parameters of each traffic source to exactly one-half of the measured call blocking ratio for that traffic source;

means for detecting the end of the congestion condition in the telecommunications network; and means for restoring the state of each switching node or exchange on the source side of each of the congested links in said telecommunications network to their pre-optimized state using the switch state information that was stored earlier.

* * * * *

UNITED STATES PATENT AND TRADEMARK OFFICE
CERTIFICATE OF CORRECTION

PATENT NO. : 5,844,886  
DATED : December 1, 1998  
INVENTOR(S) : Aron Szentesi

Page 1 of 1

It is certified that error appears in the above-identified patent and that said Letters Patent is hereby corrected as shown below:

<u>Title page,</u>
Item [21], replace "775,443" with --08/775,443 --

<u>Column 5,</u>
Line 38, replace "to and to" with -$t_c$ and $t_o$ --

Signed and Sealed this

Twenty-sixth Day of February, 2002

Attest:

JAMES E. ROGAN
*Director of the United States Patent and Trademark Office*

*Attesting Officer*